(12) United States Patent
Oh

(10) Patent No.: US 6,771,986 B1
(45) Date of Patent: Aug. 3, 2004

(54) ADAPTIVE ARRAY ANTENNA AND INTERFERENCE CANCELER IN A MOBILE COMMUNICATIONS SYSTEM

(75) Inventor: Chang-Hun Oh, Seoul (KR)

(73) Assignee: Samsung Electronics Co., Ltd. (KR)

( * ) Notice: Subject to any disclaimer, the term of this patent is extended or adjusted under 35 U.S.C. 154(b) by 915 days.

(21) Appl. No.: 09/116,018

(22) Filed: Jul. 15, 1998

(30) Foreign Application Priority Data

Jul. 15, 1997 (KR) .......................................... 97-32762

(51) Int. Cl.[7] .................................................. H04B 1/38
(52) U.S. Cl. .................... 455/562.1; 455/561; 455/296; 370/334
(58) Field of Search ................................ 455/296, 561, 455/562, 63, 67.3, 67.6, 303, 307; 342/379, 384, 381; 375/346, 137, 149

(56) References Cited

U.S. PATENT DOCUMENTS

| | | | | |
|---|---|---|---|---|
| 3,763,490 A | * | 10/1973 | Hadley et al. | 343/100 |
| 3,981,014 A | * | 9/1976 | Masak | 343/100 |
| 4,450,448 A | * | 5/1984 | Albanese et al. | 342/379 |
| 5,152,010 A | * | 9/1992 | Talwar | 455/278 |
| 5,493,307 A | * | 2/1996 | Tsujimoto | 342/380 |
| 5,553,062 A | | 9/1996 | Schilling et al. | |
| 5,689,528 A | * | 11/1997 | Tsujimoto | 375/233 |
| 5,694,416 A | * | 12/1997 | Johnson | 375/148 |
| 5,924,020 A | * | 7/1999 | Forssen et al. | 455/129 |
| 6,101,399 A | * | 8/2000 | Raleigh et al. | 455/561 |
| 6,128,486 A | * | 10/2000 | Keskitalo et al. | 455/422.1 |
| 6,188,718 B1 | * | 2/2001 | Gitlin et al. | 375/148 |

OTHER PUBLICATIONS

Robert A. Monzingo et al., "Introduction to Adaptive Arrays", A Wiley–Interscience Publication, 1986.

* cited by examiner

Primary Examiner—Tilahun Gesesse
(74) Attorney, Agent, or Firm—Dilworth & Barrese, LLP.

(57) ABSTRACT

A receiver in a mobile communications system is provided. The receiver includes an adaptive array antenna having a plurality of antenna elements for forming a beam in the direction of a desired signal. Each of the plurality of elements has an adaptive linear filter associated therewith. A real time adaptive receive processor controls beam patterns and directions of the plurality of antenna elements at a reception angle of the desired user. An interference canceller operatively connected to said adaptive array antenna detects a multi-user interference signal from the desired signal and cancels the multi-user signal.

17 Claims, 5 Drawing Sheets

ADAPTIVE ARRAY ANTENNA AND INTERFERENCE CANCELER IN A MOBILE COMMUNICATIONS SYSTEM

BACKGROUND OF THE INVENTION

1. Field of the Invention

The present invention relates to mobile communications systems and, in particular, to a device and method for eliminating an interference signal in a mobile communication system.

2. Description of the Related Art

Recently, due to the rapidly growing demand for mobile communication, much attention has been directed to Code Division Multiple Access (CDMA) as a means for performing such communication. There are two types of CDMA systems. The first type is referred to as Direct Sequence CDMA or DS-CDMA, which is an application of spread spectrum technology. The second type is referred to as Frequency Hopping CDMA or FH-CDMA. In Korea, a digital DS-CDMA communication system has been developed and is currently in service. Additionally, DS-CDMA is currently being used in Korea for Personal Communications Services (PCS) systems.

In the above DS-CDMA system, diminished performance is primarily caused by multipath fading and multi-user interference (MUI), which, in turn, are caused by multipath propagation and the simultaneous use of the same channel by multiple users, respectively. Thus, stated alternatively, the performance of a DS-CDMA system can be improved by mitigating the effects of multipath fading and MUI.

Multi-user interference is generally reduced by the following two techniques: using an adaptive array antenna; and co-channel interference cancellation based on correlation. The use of an adaptive array antenna allows for the effective removal of an interference signal by appropriately controlling the antenna's directivity. However, this technique is limited in eliminating an undesired signal received at the same angle as that of a desired signal. On the other hand, the co-channel interference cancellation technique generally assures the removal of MUI, thereby improving system performance. However, mitigation of co-channel interference requires a PN (Pseudo Noise) code which exhibits excellent correlation characteristics, and an interference canceller. System hardware complexity increases with the number of users that simultaneously access the system because undesired spread spectrum signals from all users are demodulated, re-spread, and then extracted from a received signal in order to recover a desired signal using a digital filter.

To solve the problems of the above techniques, there is a need for a receiver having an adaptive array antenna and an interference canceller which are serially connected. An adaptive antenna and an interference canceller were used in the prior art as a way to increase DS-CDMA system capacity. However, such use was not employed in a CDMA environment where they should be serially connected, but rather, such use occurred in a general spread spectrum communication environment. In this context, it is difficult to make a direct application of the conventional devices to a CDMA system.

SUMMARY OF THE INVENTION

An object of the present invention is to provide a receiver and a receiving method in a radio communications system, which can increase reception performance by use of an adaptive array antenna and an interference canceller which are serially connected.

According to one aspect of the invention, a receiver in a mobile communications system is provided. The receiver includes: an adaptive array antenna having a plurality of antenna elements for forming a beam in the direction of a desired signal, each of the plurality of elements having an adaptive linear filter associated therewith; a real time adaptive receive processor for controlling beam patterns and directions of the plurality of antenna elements at a reception angle of the desired user; and an interference canceller operatively connected to said adaptive array antenna for detecting a multi-user interference signal from the desired signal and cancelling the multi-user signal.

According to another aspect of the invention, a receiving method in a mobile communications system is provided. The method includes the steps of: controlling beam patterns and directions of an adaptive array antenna to coincide with a reception direction of a desired signal; forming a beam in the reception direction of the desired signal; and eliminating an interference signal received at a different angle than the reception angle of the desired signal.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF PREFERRED EMBODIMENTS

Figure 1:
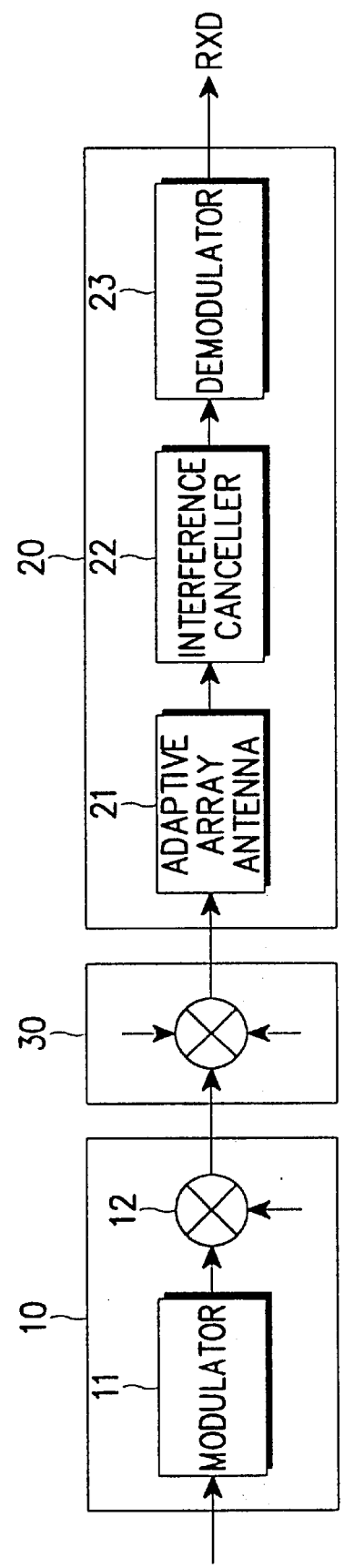
FIG. 1 is a block diagram of a receiver according to an embodiment of the present invention in a radio communications system.

FIG. 1 is a block diagram of an RF (Radio Frequency) transmitter and receiver in a radio communications system according to an embodiment of the present invention. An RF transmitter 10 includes: a modulator 11 for modulating transmit data TXD in the form of a transmission signal; and a mixer 12 for up-converting the frequency of the modulated signal received from modulator 11 into a desired transmission frequency. An RF receiver 20 includes: an adaptive array antenna 21 for adaptively receiving an RF signal; an interference canceller 22 for cancelling co-channel interference using correlation of the received RF signal; and a demodulator 23 for demodulating the signal received from interference canceller 22 to the original data and for generating receive data RXD. An adder 30 introduces an MUI signal which deteriorates the received RF signal and AWGN (Additive White Gaussian Noise). The RF receiver 20 of FIG. 1 is assumed to be ideal.

A description of the operation of receiver 20 according to an embodiment of the present invention will now be described. The adaptive array antenna 21, which is serially connected to interference canceller 22, eliminates an interference signal received at a different angle than that of a desired signal. The interference canceller 22 eliminates the remaining interference signal and also eliminates an interference signal received at the same angle as that of the desired signal, thereby more effectively removing MUI. Now, the extent to which the performance of a DS-CDMA/DPSK (Differential Phase-Shift-Keying) cellular system can be improved by the use of adaptive array antenna 21 and interference canceller 22 will be described hereinbelow.

In the embodiment of the present invention, it is assumed that data is transmitted on a reverse link in a mobile radio communications system and a channel model is a radio channel plagued by AWGN and MUI. As shown in FIG. 1, receiver 20 utilizes adaptive array antenna 21 and interference canceller 22 in a serially connected configuration in order to increase the reception performance of the radio communications system.

If power control is perfectly implemented in the mobile communications system between a base station and its associated mobile stations, all the mobile stations in a cell send signals of the same power level to the base station. Thus, an interference signal has the same power level and path loss as those of a reference signal. Let MUI from a different user be a Gaussian random parameter. Then, the degree to which an interference signal adds to MUI can be expressed as $$MI = \frac{2}{3N} E_b a^2 \quad (1)$$

where the N is PN (Pseudo Noise) code length and a is the instantaneous amplitude of a transmission signal. The number of users that can be simultaneously served in a cell is calculated by $$K_c = \frac{V_m K}{N_{sect}} - 1 \quad (2)$$

where $N_{sect}$ is the number of sectors in a cell, $V_m$ is a voice activity factor given as ⅜, and K is the total number of users per cell.

Thus, interference $I_1$ in the same cell can be expressed as $$I_1 = K_c \frac{2}{3N} E_{bn} \cdot a^2 \quad (3)$$

and interference $I_2$ from a mobile station in an adjacent cell can be expressed as $$I_2 = (K_c + 1) \sum_{K=1}^{C} \frac{2}{3N} E_b \cdot a_k^2 \quad (4)$$

where C is the number of adjacent interfering cells and $a_k$ is the instantaneous amplitude of a signal transmitted from a kth mobile station.

Assume that the MUI $I_2$ from an adjacent cell is 2.2 times larger than the Rappaport interference (for an article discussing Rappaport interference see "Analytical Results for Capacity Improvements in CDMA", by J. C. Liverti Jr. and T. S. Rappaport, appearing in IEEE Transactions on Vehicular Technology, Vol. No.3, August 1994, pp. 680–90). Then, a signal to noise ratio (SNR) involving MUI from an adjacent cell in the DS-CDMA system becomes $$SNR = \frac{E_b \cdot a^2}{N_1 + N_0/2} = \frac{E_b \cdot a^2}{I_1 + I_2 + N_0/2} \quad (5)$$

$$= \frac{E_b \cdot a^2}{\frac{2K_c}{3N} E_b \cdot a^2 + \frac{2(K_c + 1)}{3N} E_b \cdot a^2 \cdot 2.2 + N_0/2}$$

where $N_0/2$ is the power spectrum density of the AWGN. MUI can be modeled as described above.

The adaptive array antenna technique will now be explained. The adaptive array antenna technique is: defined as the detection of the direction of a signal by flexibly varying the direction of a beam according to the variable direction of the received signal, as compared to a conventional antenna technique wherein the antenna receives a signal in a fixed state. The adaptive array technique provides more effective reception of a desired signal and allows for the removal of an interference signal received from a different direction than that of the desired signal. As such, system performance is significantly improved. The adaptive array antenna 21 is composed of antenna array elements and an adaptive receive processor for processing a signal in real time. The adaptive processor, using a predetermined algorithm, automatically controls a weighting value which optimizes the SNR, so that the array elements form a beam in the direction of the desired signal. Also, the processor, by null-steering, reduces the reception gain of an interference signal received from a different direction than that of the desired signal to about −60 dB in order to remove the interference signal. However, a problem with the adaptive array antenna technique is its incapability in eliminating an interference signal received at the same angle as that of the desired signal.

Figure 2:
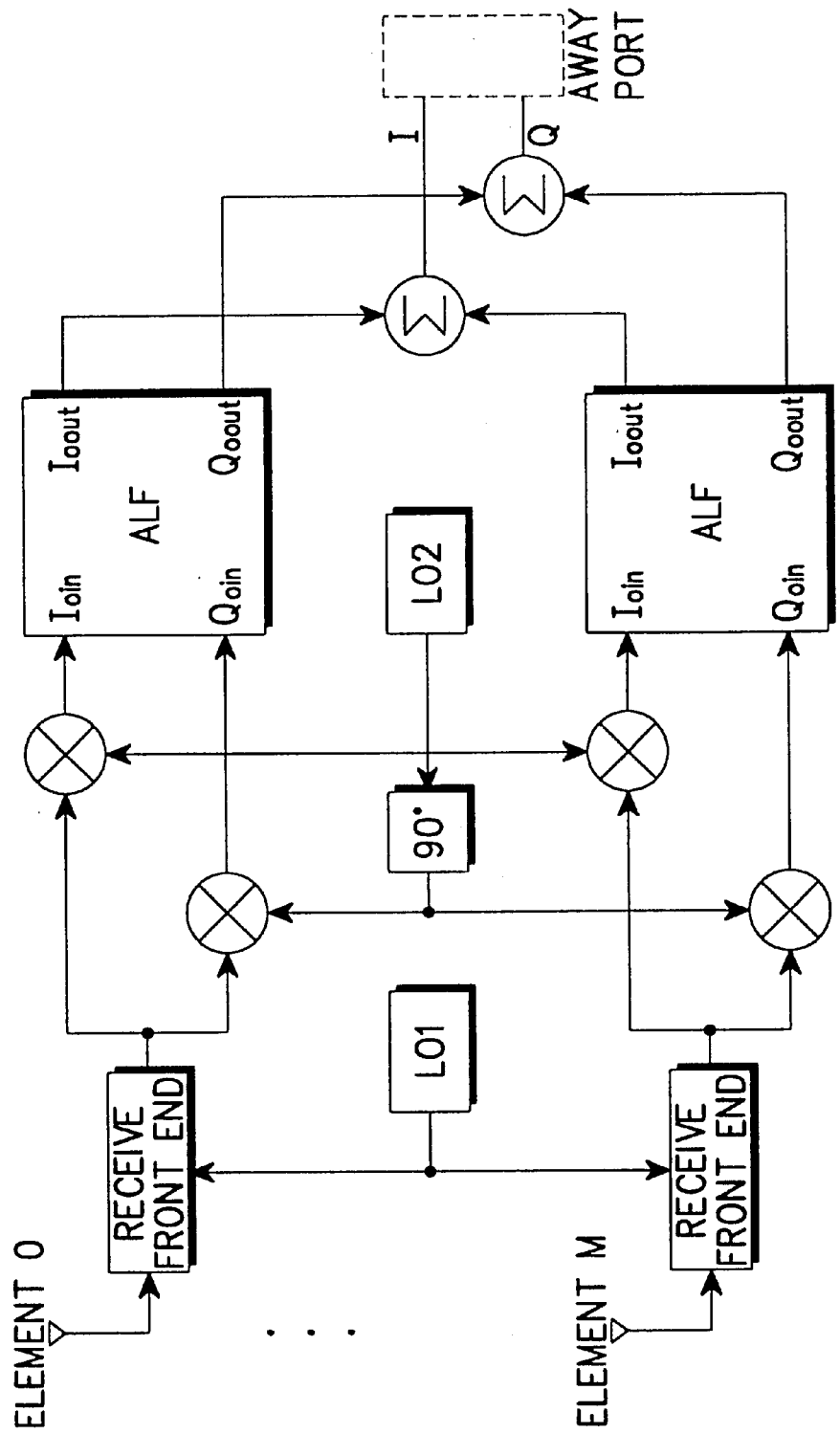
FIG. 2 is a block diagram of an adaptive array antenna shown in FIG. 1.

FIG. 2 is block diagram of the adaptive array antenna 21 of FIG. 1 according to an illustrative embodiment of the present invention. Antenna 21 has M array elements. Each mobile station uses an omni-directional antenna and a base station forms a directional beam for each user in a cell. It is assumed that a beam pattern is provided in the direction of a desired user. This directional beam forming is implemented by the M array elements. With K users in a cell, each of the array elements has K adaptive linear filters (ALFs). Hence, MxK ALFs are provided to adaptive array antenna 21. If the ALFs are digitally implemented, a different ALF parameter can be used for each user. Therefore, a different beam pattern is provided to each user. In the illustrative embodiment of the invention, users are distributed uniformly in a cell and power control is perfectly performed between a base station and its associated mobile stations. In addition, a beam pattern is directed not vertically, but rather, horizontally at 360° so as to be provided in the direction of a desired user. Here, the regulated beam pattern G(θ) of the antenna is $$G(\theta) \text{ [dB]} = 10\log_{10}\frac{|A(\theta)|^2}{M^2} \tag{6}$$

where A(θ) is a beam pattern and M is the number of array elements. The directivity D of the antenna is.

$$D = \frac{2\pi}{\int_0^{2\pi} G(\theta)d\theta} \tag{7}$$

In the illustrative embodiment of the invention, the Rappaport interference in the cases of D=2.67 and D=3.0 are considered.

The adaptive array antenna 21 effectively receives a desired signal and eliminates an interference signal received from a different direction than that of the desired signal. Yet, it cannot eliminate an interference signal received from the same direction as that of the desired signal. To overcome this limitation of adaptive array antenna 21, interference canceller 22 is employed.

Figure 3:
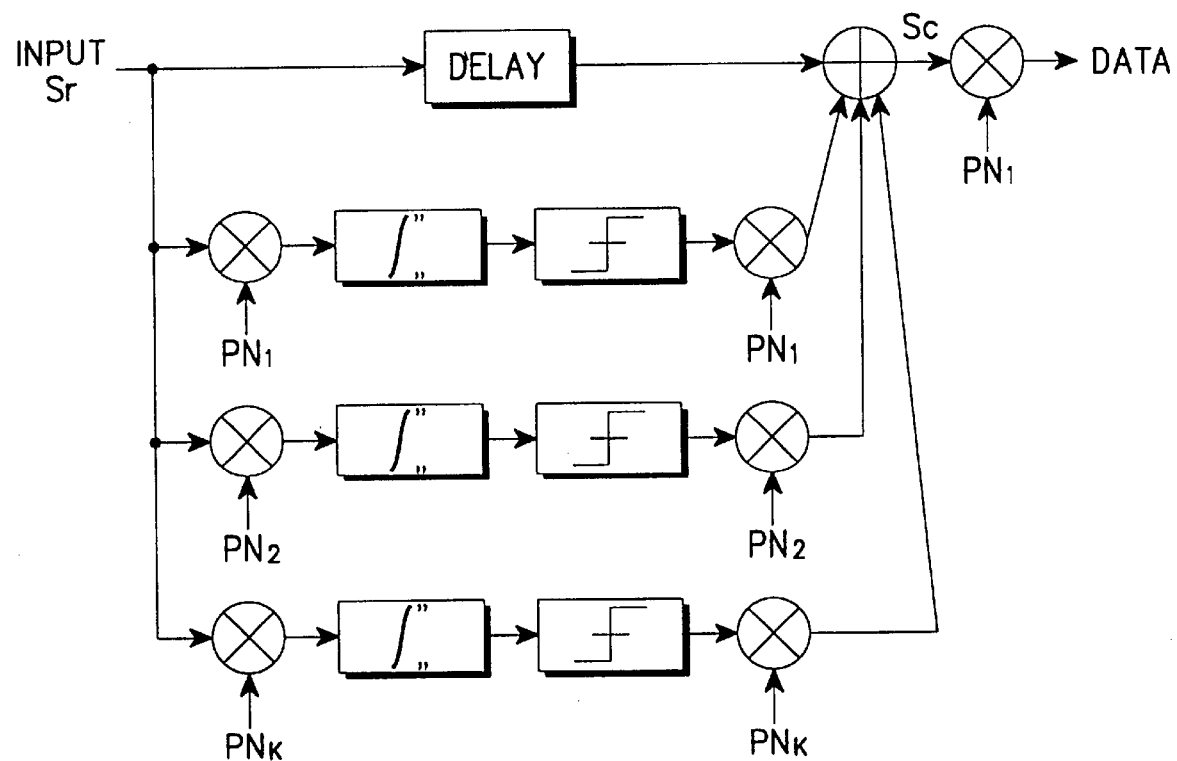
FIG. 3 is a block diagram of an interference canceller shown in FIG. 1.

FIG. 3 is a block diagram of interference canceller 22 shown in FIG. 1. If the amplitude of a baseband signal is ±1 at an input terminal of interference canceller 22, the signal to noise ratio $SNR_{DS1}$ of an input signal $S_r$ is $$SNR_{DS1}=1/[K_c\cdot 2/3N)+(N_0/E_b)] \tag{8}$$

If a bit error is not generated in signals $S_2, S_3, \ldots, S_k$, which are included in signal $S_r$ (r=2, 3, . . . , and k), then MUI is entirely eliminated. On the other hand, if an error is found during correlation detection in a signal from an ith user (I=2, 3, . . . , k), such signal being included in signal $S_r$, then a signal recovered by a PN code for the ith user $PN_i$ which is different from the signal $S_i$ is spread again by $PN_i$ and added to the signal $S_r$ delayed by T. Here, since signal $S_i$ (which includes an error) is added to input signal $S_r$ as MUI, a signal $S_c$ has twice the MUI voltage (four times the power) of signal $S_r$. As a result, the signal to noise ratio $SNR_{DS2}$ between signals $S_c$ and $S_i$ is calculated by $$SNR_{DS2}=1/[A_V\cdot 2/3N)+(N_0/2E_b)]SNR_{DS2} \tag{9}$$

$$=1/[(4K_c\cdot Peb_{DS1}\cdot 2/3N)+(N_0\cdot 2E_b)]$$

where $Peb_{DS1}$ is an error probability equation using $SNR_{DS1}$ and $A_v$ is $4K_c\times Peb_{DS1}$.

A description of the performance of a DS-CDMA/DPSK cellular system employing adaptive array antenna 21 and interference canceller 22 according to the invention will now be given.

(1) Error Probability Under AWGN and MUI

In consideration of the MUI model, voice activity factor, and sectorization of an adjacent cell, an error probability equation for the DS-CDMA/DPSK system in an environment having AWGN and MUI is given by $$P_{el} = \frac{1}{2}\exp(-r_1)$$

and $$r_1 = \frac{E_b\cdot a^2}{\frac{2K_c}{3N}E_b\cdot a^2 + \frac{2(K_c+1)}{3N}E_b\cdot a^2\cdot 2.2 + N_0/2} \tag{10}$$

where $K_c$ is the number of users causing MUI.

(2) Improvement of System Performance with Adaptive Array Antenna

The adaptive array antenna 21 eliminates an interference signal received from a different direction than that of a desired signal by detecting the direction of the interference signal and providing a null to the interference signal. As a result, the performance of a received signal is increased. An error probability equation for a DS-CDMA/DPSK system employing adaptive array antenna 21, utilizing the directivity of the antenna, is $$P_A = \frac{1}{2}\exp(-r_A)$$

and $$\gamma_A = \frac{E_b\cdot a^2}{\frac{2K_c}{3ND}E_b\cdot a^2 + \frac{2(K_c+1)}{3N}E_b\cdot a^2\cdot 2.2 + N_0/2} \tag{11}$$

Equation (11) is valid when power control is perfectly performed between a base station and its associated mobile stations, and when the beam pattern of an antenna in the base station is not directed vertically.

(3) Improvement of System performance with Interference Canceller

An error probability equation for a DS-CDMA/DPSK system employing interference canceller 22 in an environment having AWGN and MUI is calculated by $$P_C = \frac{1}{2}\exp(-r_C)$$

and $$r_C = \frac{E_b\cdot a^2}{4P_{el}\cdot\left[\frac{2K_c}{3N}E_b\cdot a^2 + \frac{2(K_c+1)}{3N}E_b\cdot a^2\cdot 2.2\right] + N_0/2} \tag{12}$$

(4) Improvement of System Performance with Serially Connected Adaptive Array Antenna and Interference Canceller The adaptive array antenna 21, which is serially connected to interference canceller 22, forms a beam in the direction of a desired signal on the basis of a weighting value calculated in the adaptive receive processor which maximizes the reception gain of the desired signal. Antenna 21 also provides a null to an MUI signal received from a different direction than that of the desired signal in order to minimize the reception gain of the MUI signal. Thus, the MUI signal is eliminated. Here, the remaining MUI signal of antenna 21 and an MUI component received at the same angle as that of the desired signal are cancelled by relying on correlation of the received signal by interference canceller 22. An error probability equation for a DS-CDMA/DPSK system using the serially connected adaptive array antenna 21 and interference canceller 22 in an environment having AWGN and MUI is $$P_{AC} = \frac{1}{2}\exp(-r_{AC})$$

and $$r_{AC} = \frac{E_b \cdot a^2}{4P_{el} \cdot \left[\frac{2K_c}{3ND}E_b \cdot a^2 + \frac{2(K_c+1)}{3ND}E_b \cdot a^2 \cdot 2.2\right] + N_0/2} \quad (13)$$

Equation (13) represents the case that the hardware of serially connected adaptive array antenna 21 and interference canceller 22 is ideally implemented.

In the following illustrative embodiments of the present invention, the performance improvements of a DS-CDMA/DPSK cellular system in the cases of implementing adaptive array antenna 21 and interference canceller 22 alone and in 15 serial connection are analyzed. FIGS. 4 to 7 illustrate numerical results from the error probability equations as functions of the number of users per cell K, PN code length N, the directivity D of adaptive array antenna 21, and the ratio of bit energy to noise power spectrun density $E_b/N_0$. In the Figures, the voice activity factor is ⅜, the cell is split into three sectors, and N is 127.

Figure 4:
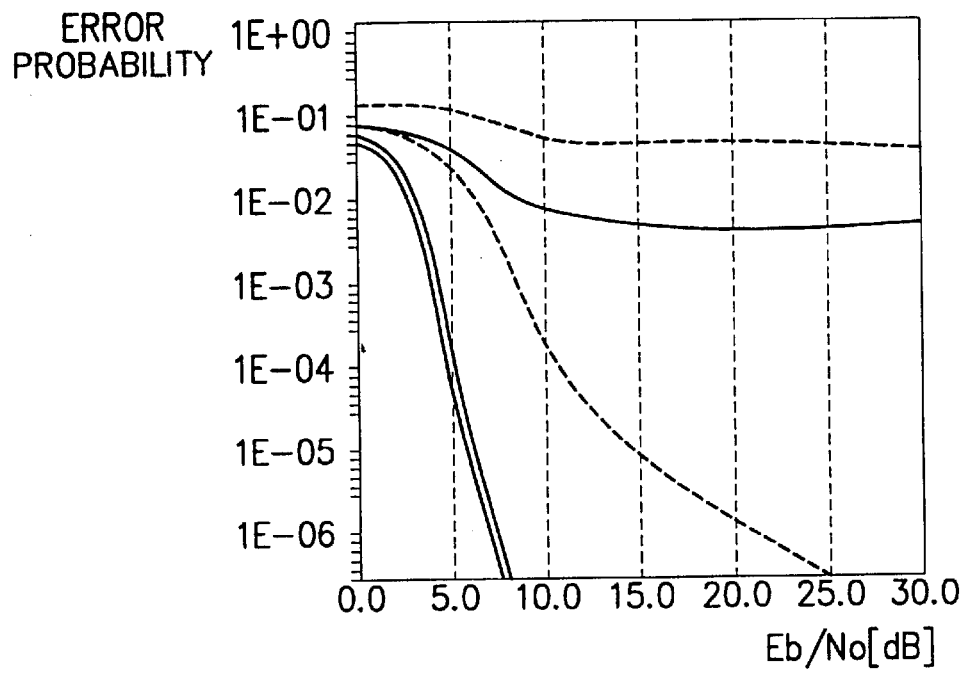
FIG. 4 is a graph showing the error probability of a Direct Sequence Code Division Multiple Access Differential Phase-Shift-Keying (DS-CDMA/DPSK) cellular system employing an interference canceller according to an embodiment of the invention.

FIG. 4 illustrates the error probability of a DS-CDMA/DPSK cellular system implementing interference canceller 22 in an environment having AWGN and MUI. As shown, the error probability significantly improves when interference canceller 22 is used. In the case of $E_b/N_0$ equal to 10 dB and K equal to 200, the error probability drops from $5.85\times10^{-2}$ to $5.40\times10^{-4}$. In the case of $E_b/N_0$ equal to 10 dB and K equal to 100, the error probability drops from $9.86\times10^{-3}$ to $1.66\times10^{-8}$.

Figure 5:
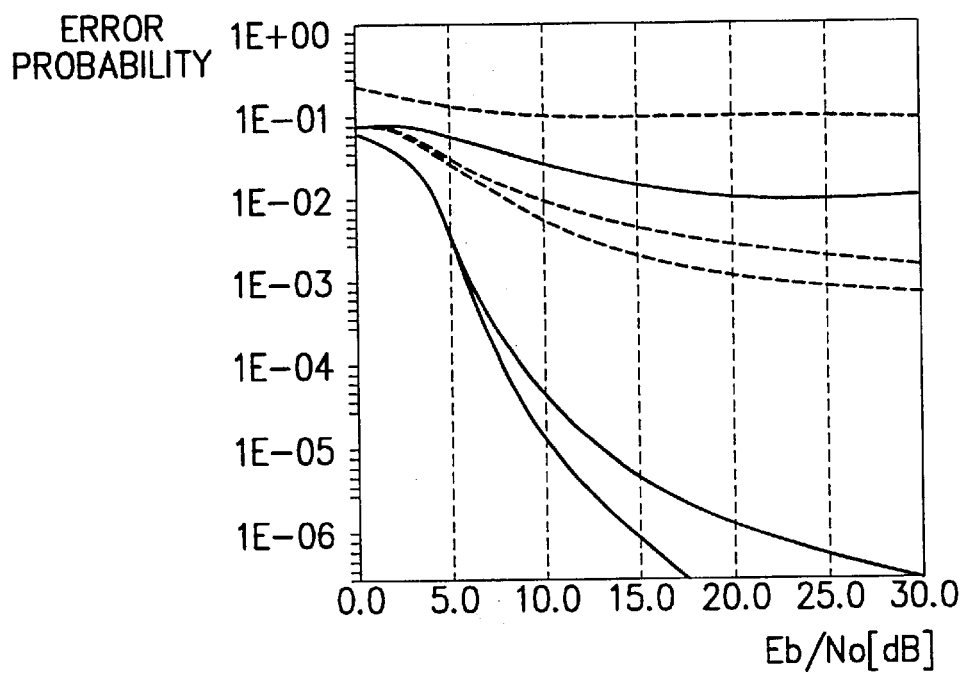
FIG. 5 is a graph showing the error probability of a DS-CDMA/DPSK cellular system employing an adaptive array antenna according to an embodiment of the is invention.

FIG. 5 illustrates the error probability with respect to D of a DS-CDMA/DPSK cellular system implementing adaptive array antenna 21 in an environment having to AWGN and MUI. In the case of $E_b/N_0$ equal to 10 dB, K equal to 200, and D equal to 2.67, the error probability drops from $5.85\times10^{-2}$ to $3.83\times10^{-3}$. In the case of $E_b/N_0$ equal to 10 dB, K equal to 200, and D equal to 3.0, the error probability drops from $5.85\times10^{-2}$ to $2.46\times10^{-3}$. Thus, as shown, system performance increases with directional gain. A comparison between the adaptive antenna technique and the interference cancellation technique reveals that the former increases system performance by less than the latter in both cases of D=2.67 and 3.0.

Figure 6:
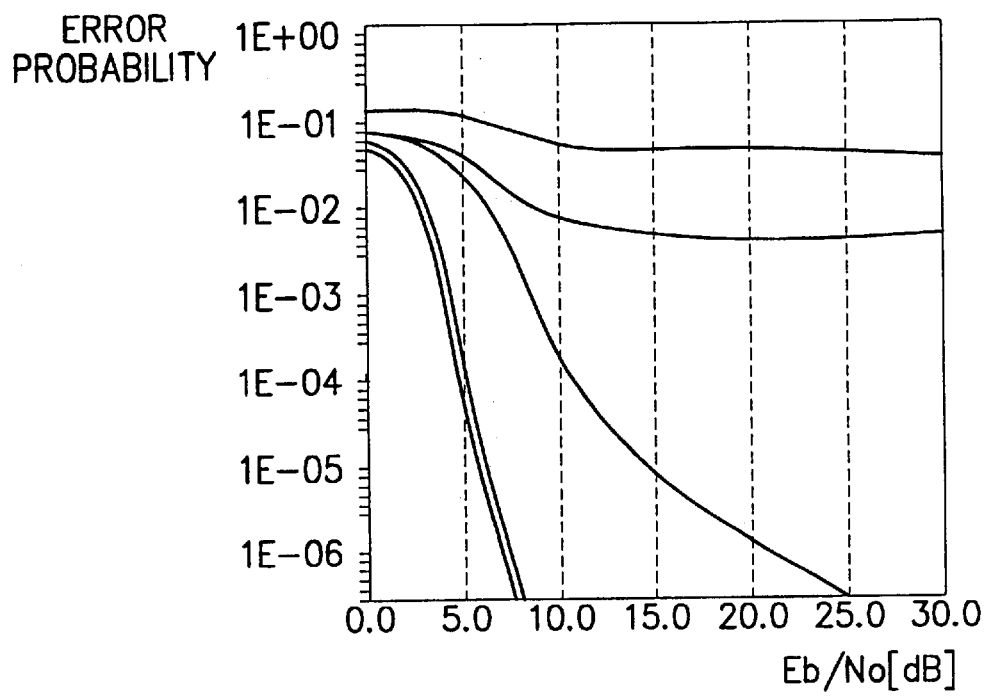
FIG. 6 is a graph showing the error probability of a DS-CDMA/DPSK cellular system employing both an adaptive array antenna and an interference canceller according to an embodiment of the invention.
Figure 7:
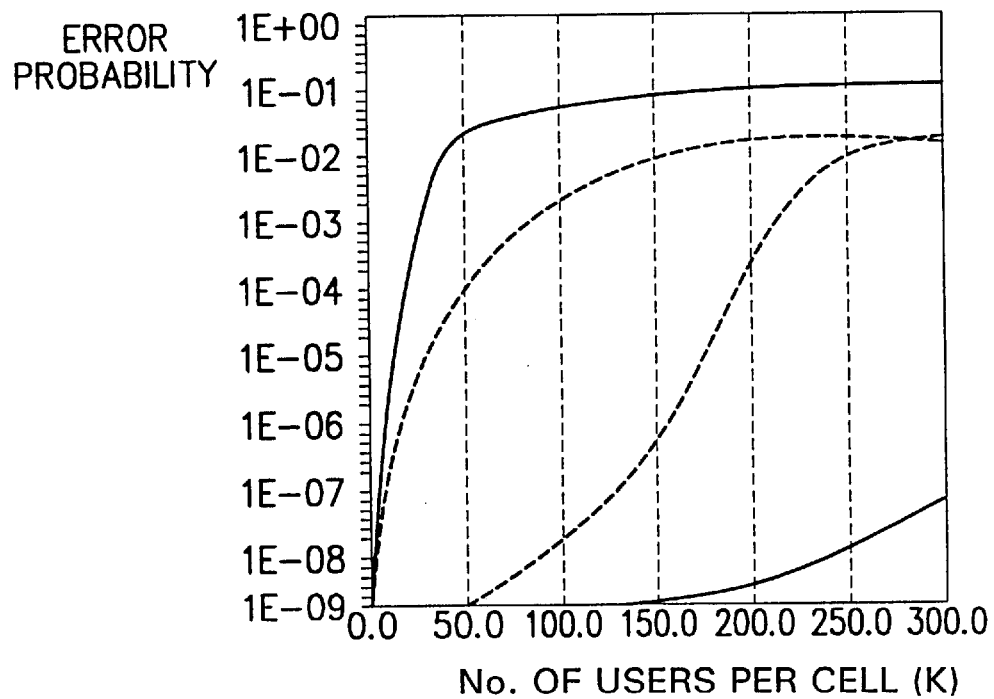
FIG. 7 is a graph showing the error probability of a DS-CDMA/DPSK cellular system employing both an adaptive array antenna and an interference canceller according to another embodiment of the invention.

FIG. 6 is a graph showing the error probability of a DS-CDMA/DPSK cellular system implementing adaptive array antenna 21 serially connected to interference canceller 22 in an environment having AWGN and MUI, and with K=200. As shown, interference canceller 22 is superior to adaptive array antenna 21 in improving system performance when K=200 and D=2.67. On the other hand, adaptive array antenna 21 gains the advantage over interference canceller 22 in terms of system performance if K is increased (K>270) as shown in FIG. 7, because demodulation errors increase with K. The error probability with adaptive array antenna 21 serially connected to interference canceller 22 and with D=2.67 is proximate to the error probability in an environment having AWGN, and lower than the error probability when antenna 21 and canceller 22 are independently used.

FIG. 7 is a graph showing the error probability with respect to K of a DS-CDMA/DPSK cellular system implementing adaptive array antenna 21 serially connected to interference canceller 22 and with $E_b/N_0$=10 dB under the same conditions 1a as those associated with FIG. 6. In the case of K=200, the error probability with adaptive array antenna 21 and interference canceller 22 serially connected is lower than that when interference canceller 22 is used alone or when adaptive array antenna 21 is used alone, by about $4.74\times10^{-4}$ and $6.68\times10^{-8}$, respectively. In conclusion, the use of adaptive array antenna 21 serially connected to interference canceller 22 is very effective in eliminating MUI.

As described above, there is a large difference between system performance depending on whether or not adaptive array antenna 21 and interference canceller 22 are serially connected or used independently. That is, except for the case where K is very large (i.e., K>270), interference canceller 22 is more effective than adaptive array antenna 21 in improving system performance, and the error probability with the serially connected adaptive array antenna 21 and interference canceller 21 is proximate to that in an environment having AWGN.

Since the performance of a mobile communications system is limited by MUI generated from the common use of the same channel by multiple users, the elimination of MUI is a major issue with respect to increasing system performance. Thus, according to the invention, a receiver in the mobile communications system employs: an adaptive array antenna for effectively receiving a desired signal and eliminating an interference signal received from a different direction than that of the desired signal; and an interference canceller for removing an interference signal received from the same direction as that of the desired signal. The use of the adaptive array antenna and interference canceller according to the invention significantly increase system performance. Due to its capability of reducing a bit error, the receiver according to the present invention is applicable to PCS systems as well as DS-CDMA systems in order to increase the performance of either such mobile communications system.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A receiving method in a Code Division Multiple Access (CDMA mobile communications system, comprising the steps of:

controlling beam patterns and directions of an adaptive array antenna to coincide with a reception direction of a desired signal;

forming a beam in the reception direction of the desired signal;

eliminating an interference signal received at a different angle than the reception angle of the desired signal; and eliminating multiple access interference signals included in signals received at the reception angle of the desired signal.

2. The method of claim 1, wherein said controlling step is performed by a real time adaptive receive processor associated with the adaptive array antenna, said adaptive receive processor being serially connected with a interference canceller, said interference canceller for eliminating multiple access interference signals included in signals received at the reception angle of the desired signal.

3. The method of claim 2, wherein the interference canceller is comprised of a plurality of interference detectors, each of the plurality of detectors including a first mixer, an integrator, a correlator, and a second mixer, said first mixer for spreading a received signal with a Pseudo-Noise (PN) code corresponding to another user, said integrator for accumulating the output signal of the first mixer, said correlator for detecting a signal correlation value of the another user, and said second mixer for spreading the correlatively detected signal with the PN code corresponding to the another user.

4. The method of claim 1, wherein the adaptive array antenna includes a plurality of antenna elements, each element of the plurality of elements having an adaptive linear filter associated therewith, and said controlling step controls beam patterns and directions of the plurality of antenna elements.

5. The method of claim 4, wherein said forming step is performed by the plurality of elements.

6. The method of claim 1, wherein the formed beam is directed horizontally at 360 degrees.

7. The method of claim 1, wherein said eliminating step further comprises the step of null-steering to eliminate the interference signal.

8. A receiving method in a Code Division Multiple Access (CDMA) mobile communications system, comprising the steps of:

eliminating an interference signal received at a different direction than a reception direction of a desired signal by controlling beam patterns and directions of an adaptive array antenna to coincide with the reception direction of the desired signal;

forming a beam in the reception direction of the desired signal;

detecting multiple access interference signals included in signals received at the reception angle of the desired signal; and eliminating, the detected multiple access interference signals in signals received at the reception angle of the desired signal.

9. The method of claim 8, wherein said detecting step is performed by a plurality of interference detectors in an interference canceller, each of the plurality of detectors including an input mixer, an integrator, and a filter, said interference canceller being serially connected with an adaptive receive processor.

10. The method of claim 9, wherein each of the plurality of interference detectors further comprises a correlator, and an output mixer, said input mixer for spreading a received signal with a Pseudo-Noise (PN) code corresponding to another user, said integrator for accumulating the output signal of the input mixer, said correlator for detecting a signal correlation value of the another user, and said output mixer for spreading the correlatively detected signal with the PN code corresponding to the another user.

11. A receiver in a Code Division Multiple Access (CDMA) mobile communications system, comprising:

an adaptive array antenna having a plurality of antenna elements for forming a beam in the direction of a desired signal, each of the plurality of elements having an adaptive linear filter associated therewith;

a real time adaptive receiver processor for controlling beam patterns and directions of the plurality of antenna elements at a reception angle of the desired signal; and an interference canceller operatively connected to said adaptive array antenna, for detecting multiple access interference signals in signals received at the reception angle of the desired signal and for eliminating the detected multiple access interference signals.

12. The receiver of claim 11, wherein said interference canceller comprises a plurality of interference, signal detectors, each of the plurality of detectors including an input mixer, an integrator, and a filter, said interference canceller being serially connected with an adaptive receive processor.

13. The receiver of claim 12, wherein each of the plurality of interference signal detectors further comprises:

a correlator for detecting a signal correlation value of another user; and an output mixer for spreading the correlatively detected signal with the PN code corresponding to said another user;

wherein said input mixer is for spreading a received signal with a Pseudo-Noise (PN) code corresponding to said another user, and said integrator is for accumulating the output signal of the input mixer.

14. The receiver of claim 11, wherein said antenna and said canceller are serially connected.

15. A receiver in a Code Division Multiple Access (CDMA) mobile communications system, comprising:

a plurality of antenna elements for forming a beam in the direction of a desired signal, each of the plurality of elements having an adaptive linear filter; and a real time adaptive receiver processor for controlling beam patterns and directions of the plurality of antenna elements at a reception angle of the desired signal, wherein said plurality of elements and said processor eliminate an interference signal received at a different angle than that of the desired signal, wherein said plurality of elements and said processor further eliminate multiple access interference signals in signals received at the reception angle of the desired signal.

16. The device of claim 15, further comprising:

an interference canceller for cancelling multiple access interference signals from the desired signal.

17. The device of claim 16, the interference canceller comprising:

a plurality of interference detectors, each of the plurality of detectors comprising:

a first mixer for spreading the received signal with a Pseudo-Noise (PN) code corresponding to another user;

an integrator for accumulating the output signal of the first mixer;

a correlator for detecting a signal correlation value of the another user; and a second mixer for spreading the correlatively detected signal with the PN code corresponding to the another user.

* * * * *